May 22, 1934.   M.-L. Y. DE PANIAGUA   1,960,142
SPARK GAP FOR ELECTRIC OSCILLATIONS GENERATORS
Filed July 26, 1933
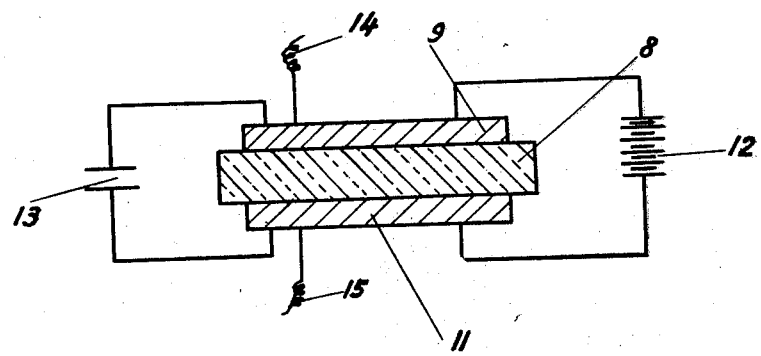
M. L. y. de Paniagua
INVENTOR
By: Marks & Clerk
Attys.

Patented May 22, 1934

1,960,142

UNITED STATES PATENT OFFICE 1,960,142

SPARK GAP FOR ELECTRIC OSCILLATIONS GENERATORS

Marie-Louise Ysabel de Paniagua, Paris, France

Application July 26, 1933, Serial No. 682,349
In France August 3, 1932

2 Claims. (Cl. 250—38)

It is already known to use for different electric applications half conducting bodies constituted by metallical particles, more or less thin, inlaid in an insulating medium.

It is particularly possible to use such bodies for generating electric oscillations, and the object of the present invention is a spark gap, designed for being used in a spark oscillator, and formed by a body of that sort constituted by bakelite and copper particles producing a solid set to which can be easily given any desired form by pressing and heating.

A simple, strong and cheap generator needing only a direct current supply can then be readily obtained.

The preparation of said body is achieved in the following way. Baked bakelite is pounded, then the so obtained powder is mingled in convenient proportions with copper in grains or thin particles, say with filing obtained with a fine-toothed file or with pulverulent metal as that used for coppering certain bodies.

The so obtained compound powder is then mingled with a solution of bakelite made in a convenient solvent, for instance acetone, the so produced dough is pressed in order to give thereto the desired form and further heated to a convenient temperature in order to obtain the polymerization of the bakelite. Said process has for its effect to give very hard, insoluble and incombustible bakelite.

The annexed figure shows by way of example how electric oscillations can be created by means of a plate constituted as explained above.

Said plate or washer 8 is disposed between metallic armatures 9 and 11, solid or hollow in order to eventually allow cooling water to flux inside, said armatures being connected with the terminals of a direct current supply 12; it is possible to connect a condenser 13 in parallel with both armatures in order to increase the capacity of the whole.

If the so constituted set is then connected by conductors 14 and 15 to the members of a spark oscillations generator, said set being disposed as spark gap, it may be seen that electric oscillations are produced. By looking at washer 8, little sparks flashing between the metallic particles inlaid in the dielectric can be perceived.

The following explanation may be given for said phenomenon: washer 8 being an imperfect conductor, the whole formed of said washer and of armatures 9 behaves as a condenser shunted by a high resistance, the capacity of said condenser may be eventually increased by condenser 13 connected in parallel therewith. When by influence of the charge produced by supply 12 the difference of potential between armatures 9 and 11 becomes high enough, sparks flash between the metallic particles discharging the condensers; further said condensers are charged again and the same cycle of phenomenon is indefinitely reproduced. The apparatus behaves thus in the same time as a spark gap as well as a relaxator.

The above explanation is however given only as an hypothesis, the invention does not depend thereon and consists in the special body and in the mounting disclosed above.

It shall be possible to vary either the size of the copper particles, or the rate of copper and bakelite constituting the plate, or both, according to the conditions under which the apparatus must work, and particularly according to the used potential and current.

What I claim is:

1. A spark oscillations generator comprising a plate made with a compound body formed by copper particles inlaid in bakelite, armatures disposed on the opposite faces of said plate, a direct current supply, means for connecting said armatures to said direct current supply, means for connecting said armature to the terminals of the generator which are normally connected to the spark gap.

2. A spark oscillations generator comprising a plate made with a compound body formed by copper particles inlaid in bakelite, armatures disposed on the opposite faces of said plate, a direct current supply, means for connecting said armatures to said direct current supply, a condenser, means for connecting in parallel said condenser to said armatures, means for connecting said armature to the terminals of the generator which are normally connected to the spark-gap.

MARIE-LOUISE YSABEL DE PANIAGUA.